April 28, 1970 SINZO KIMURA ET AL 3,509,321

TOASTING PERIOD CONTROL DEVICES FOR AUTOMATIC TOASTERS

Filed March 16, 1967 11 Sheets-Sheet 1

Sinzo Kimura
Hiroo Hosono INVENTORS

BY Wenderoth, Lind & Ponack

ATTORNEYS

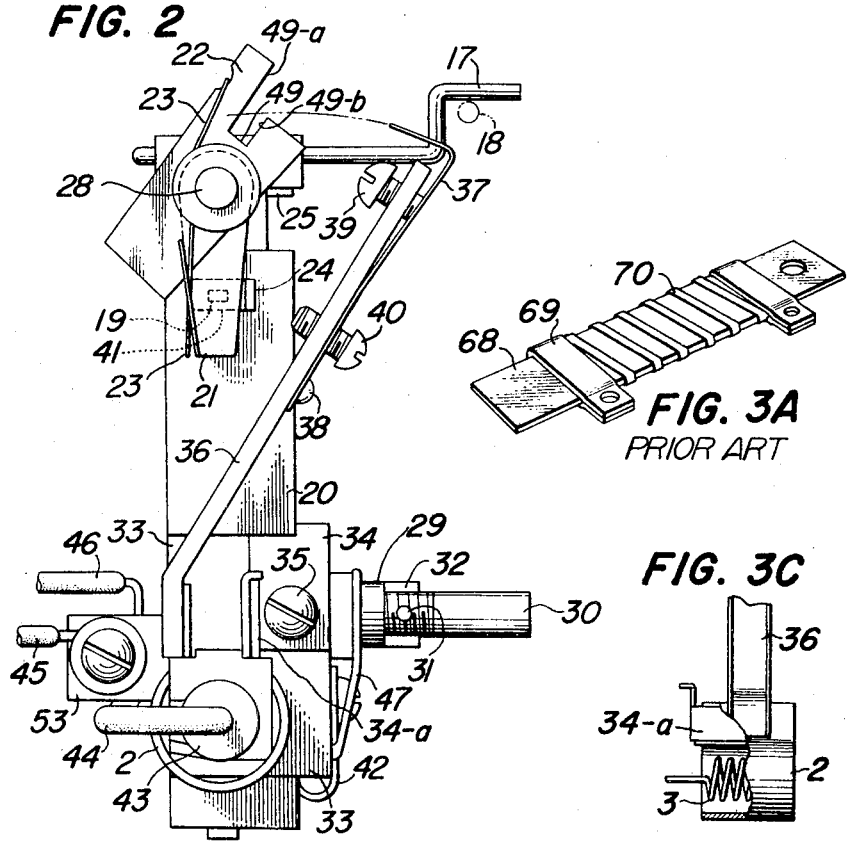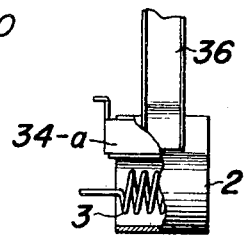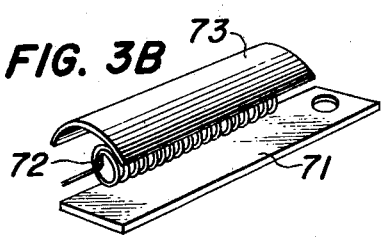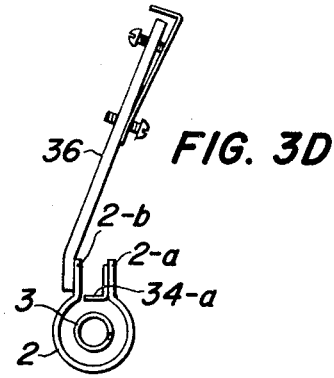

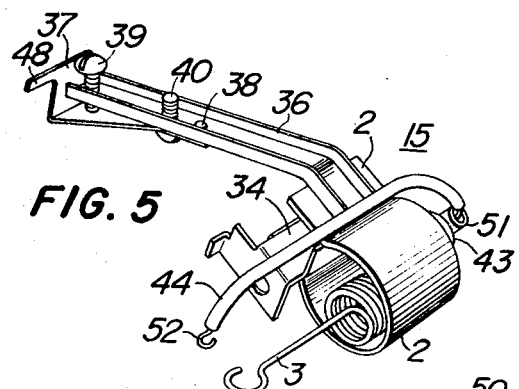
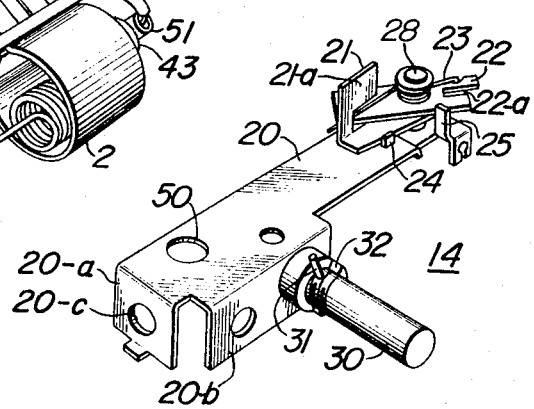
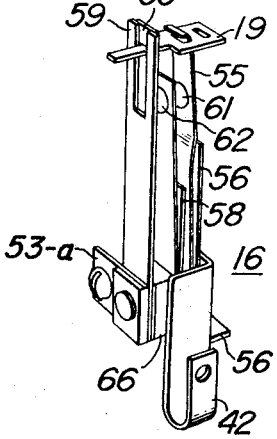
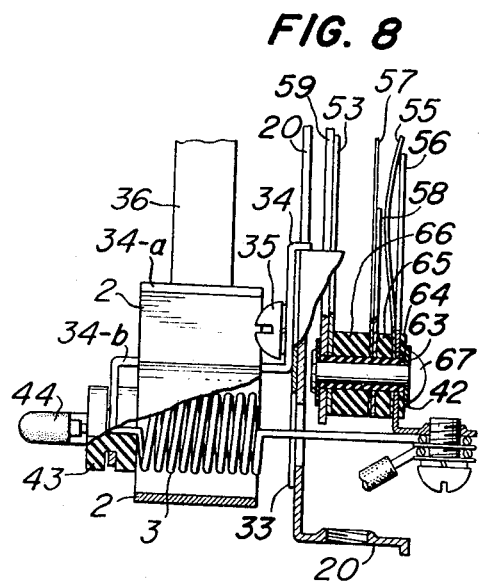

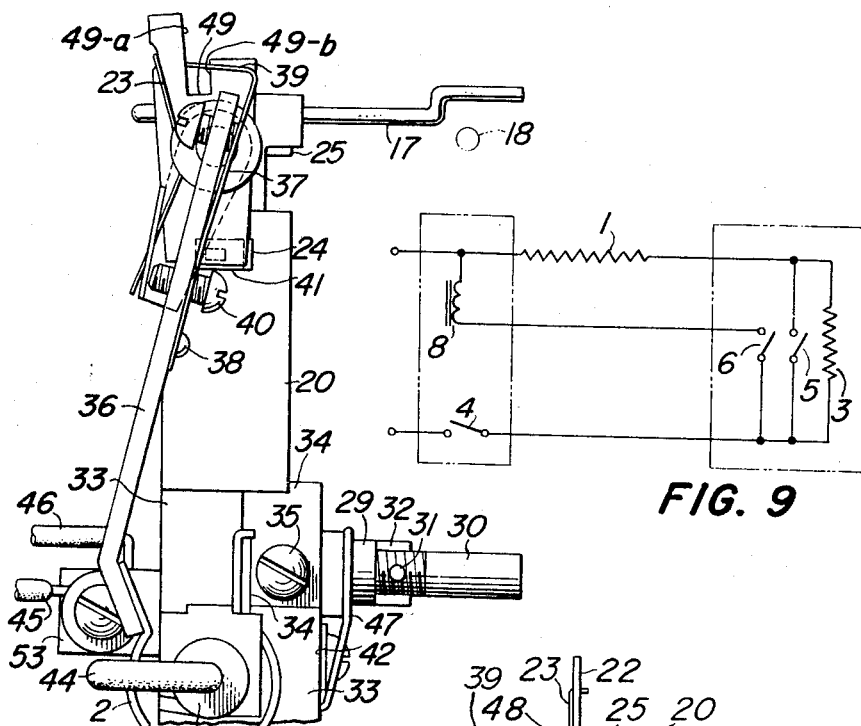
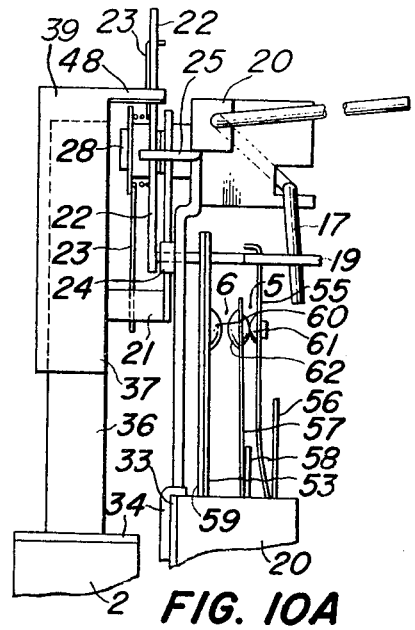

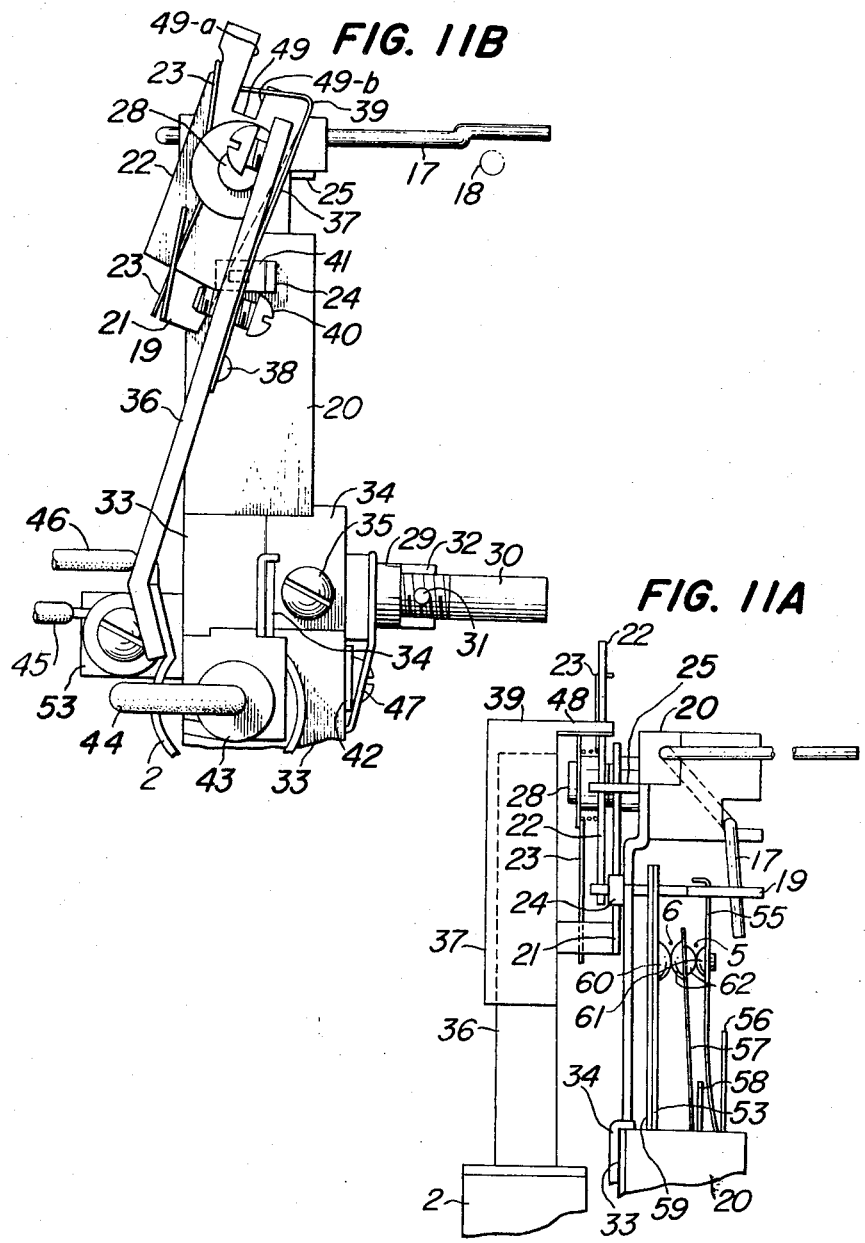

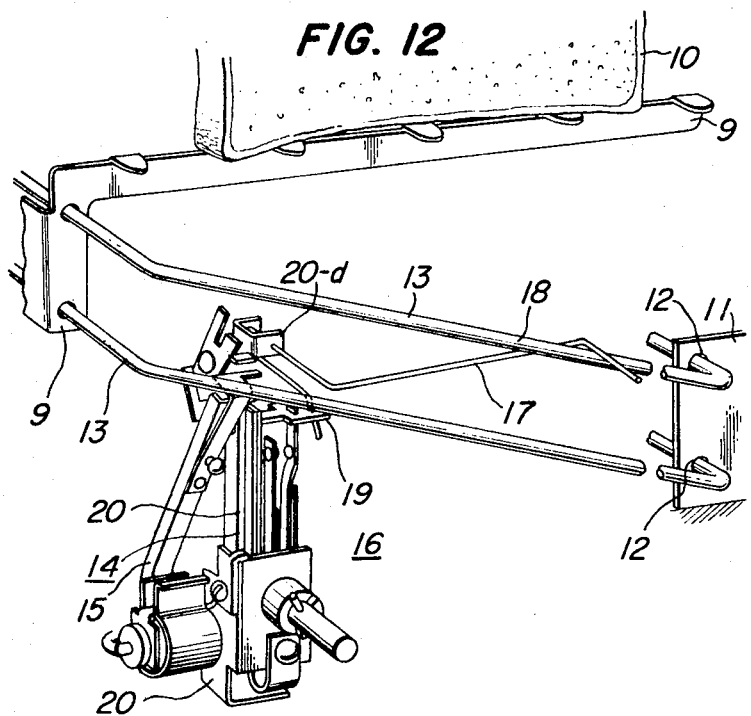

Inventive Timer

Conventional Timer

United States Patent Office 3,509,321
Patented Apr. 28, 1970

3,509,321
TOASTING PERIOD CONTROL DEVICES FOR AUTOMATIC TOASTERS
Sinzo Kimura, Higashi-Osaka-shi, and Hiroo Hosono, Osaka, Japan, assignors to Matsushita Electric Industrial Co., Ltd., Osaka, Japan, a corporation of Japan
Filed Mar. 16, 1967, Ser. No. 623,659
Claims priority, application Japan, Mar. 23, 1966, 41/18,378; Dec. 6, 1966, 41/80,506, 41/112,043; Dec. 23, 1966, 41/85,093
Int. Cl. H05b 1/02
U.S. Cl. 219—492                                7 Claims

ABSTRACT OF THE DISCLOSURE

In thermostats adapted to be used for controlling the toasting cycle of automatic toasters, the present invention is concerned with a bimetallic timer system which is capable of controlling the toasting period by means of heat deflection and cooling deflection of a bimetallic element. This specification describes a novel timer of the type specified above, which has overcome the drawbacks of poor followup characteristics against voltage fluctuation, narrow adjustable range of toasting period and irregularly in toasting period, possessed by conventional bimetallic timers, and which comprises radiation type heat sensitive means composed of a ring-shaped bimetallic element and a heater element arranged centrally of said bimetallic element, switch means to control said heating element and toasting heater element, and toasting period adjusting means adapted to adjust the heat deflection and cooling deflection of said bimetallic element.

---

The present invention generally relates to a toasting period control device for automatic toasters and particularly to a heat up-cool down type thermal timer mechanism which is adapted to control the toasting period of a toaster during continuous cycles of toasting operation by a sum of the heating period and cooling period of a bimetallic element upon conducting and interrupting current through a sub-heater, connected in series to a main heater for toasting the bread.

Methods of controlling the toasting degree of bread being toasted in a toaster are generally categorized into two types; one is to control the toasting degree by detecting the surface temperature of the bread being toasted and the other is to control the toasting degree externally of a bread toasting chamber, irrespective of the surface condition of the bread, by setting a toasting cycle in a thermal timer. The latter method using a timer has the following advantages:

(1) The operating temperature of the thermal timer is so high that the effect of the ambient temperature is small and accordingly irregularity in the operating period can be reduced.

(2) The construction of the timer is simple, so that the timer can be provided in a unit form and thus productivity can be promoted.

(3) Handling is easy because the toasting degree can be adjusted without requiring attention to the interior of the toaster oven, as long as a toasting cycle has once been set at a desired period.

(4) Upon completion of one toasting cycle, another toasting cycle can be commenced immediately thereafter.

Heretofore, thermal timers of the type which make use of the deflection of a bimetallic element have been most widely used and most of the thermal timers of the type described use, as a heat sensitive element, a bimetal strip having a heater element wound thereon with insulating strips, such as mica, interposed therebetween, the arrangement being such that a bread support is unlatched directly by said heat sensitive element.

The conventional thermal timers, therefore, have the following drawbacks:

(1) The operating temperature of the timer cannot be elevated since the bimetallic element is actuated by heat transmitted thereto through the insulating strips. Therefore, it is difficult to obtain the advantage that it is less susceptible to the ambient temperature. Moreover, since the thermal timer is operated only by the transmission heat, its sensitivity to voltage fluctuation in a main heater is very low and consequently the toasting degree is varied even with a variation in the ambient temperature.

(2) The adjustable range of the toasting degree is very narrow. This is because the toasting degree is adjusted only by the heat deflection of the bimetallic element.

(3) Winding of the heater element on the bimetallic element is laborious, rendering the productivity of the timer low.

(4) Irregularity in the toasting period is large with a current of low wattage.

(5) Random resetting causes erroneous operation of the toaster in the next toasting cycle.

It is, therefore, an object of the present invention to provide a thermal timer which obviates a number of drawbacks possessed by the conventional thermal timers for automatic toasters and in which a ring-shaped bimetallic element is used as heat sensitive means and said bimetallic element is actuated by the radiation heat of the heater element arranged centrally of said bimetallic element, whereby variation in the toasting period resulting from fluctuation of a source voltage can be eliminated entirely.

Another object of this invention is to provide a thermal timer in which, in order to elevate the operating temperature of a bimetallic element as high as possible, to thereby completely avoid erroneous operation of the timer caused by variation in the room temperature, a heater element for heating the bimetallic element is heated to a red hot so as to elevate the saturation temperature of said bimetallic element with a large amount of radiation heat as well as the convection heat from said heater element.

Still another object of this invention is to provide a thermal timer in which the heating period and cooling period of a bimetallic element are adjustable respectively in one toasting cycle, whereby the adjustable range of toasting degree, that is the range within which a slice of bread is toasted to a high degree for a long period or to a low degree for a short period is expanded.

Still another object of this invention is to provide a thermal timer which is adapted for use, as control means, with a toaster operable with a current of relatively low wattage for toasting bread over a long period and includes a bimetallic element having a high saturation temperature, and which enables continuous cycles of toasting operation to be obtained with stability and with less irregularity over a lengthy period of time.

Still another object of this invention is to provide a thermal timer which is capable of suitably varying the toasting period in continuous cycles of toasting operation in accordance with the atmospheric temperature which rises progressively as the toasting cycle is repeated.

Still another object of this invention is to provide a thermal timer which is made adaptable for use with any and all types of toasters by changing the thickness of a bimetallic element in heat sensitive means and the capacity of a heater element, and by changing switch means used in combination with said heat sensitive means.

Still another object of this invention is to provide a thermal timer which is capable of minimizing a load to which switch means for automatically controlling the vertical movement of a toasting heater and a bread support taking place upon actuation of a bimetallic element in heat sensitive means is subjected, whereby irregularity in operation of the toaster caused by said load is reduced.

Still another object of this invention is to provide a thermal timer in which a simple slow-operating switch adapted to operate only in a direction of conducting a current through the circuit is employed as switch means which has influence on irregular operation of the timer and said switch is operatively associated with a bimetallic element by lever means for switching operation, and which, therefore, is stable in operation, has a long service life and is inexpensive.

Still another object of this invention is to provide a thermal timer which may be provided in a compact unit form and readily made adaptable for use in combination with any and all types of toasters.

Still another object of this invention is to provide a thermal timer wherein heat sensitive means, switch means and operating means are provided in the form of three independent units, so that said thermal timer can be simply assembled with said units and therefore has a high workability.

These and other objects and features of the present invention will become more apparent from the following detailed description when taken in conjunction with the accompanying drawings, in which:

FIG. 2 is an enlarged side elevation illustrating the construction of the thermal timer of the invention;

FIG. 3 is a set of enlarged side elevations illustrating heat sensitive means of the thermal timer in comparison with two conventional forms;

FIGS. 3A and 3B are perspective views of two different conventional timers, FIGS. 3C and 3D are a front view and an elevational view of the timer of the present invention respectively.

FIG. 5 is a perspective view illustrating the construction of the heat sensitive means of the thermal timer;

FIG. 6 is a perspective view of switch means of the thermal timer;

FIG. 7 is a perspective view of a fixture by means of which a bracket, the switch means and the heat sensitive means of the thermal timer are combined;

FIG. 8 is a side elevation illustrating the connection between the heat sensitive means and switch means of the thermal timer;

FIG. 9 is a circuit diagram of the automatic toaster employing the thermal timer of the present invention;

FIGS. 10A and 10B are a set of side elevations illustrating the thermal timer in a first operative position;

FIGS. 11A and 11B are a set of side elevations, similar to FIG. 10, illustrating the thermal timer in a second operative position;

FIG. 12 is a perspective view illustrating the engagement between the thermal timer and an automatically elevating bread support;

Figure 14A:
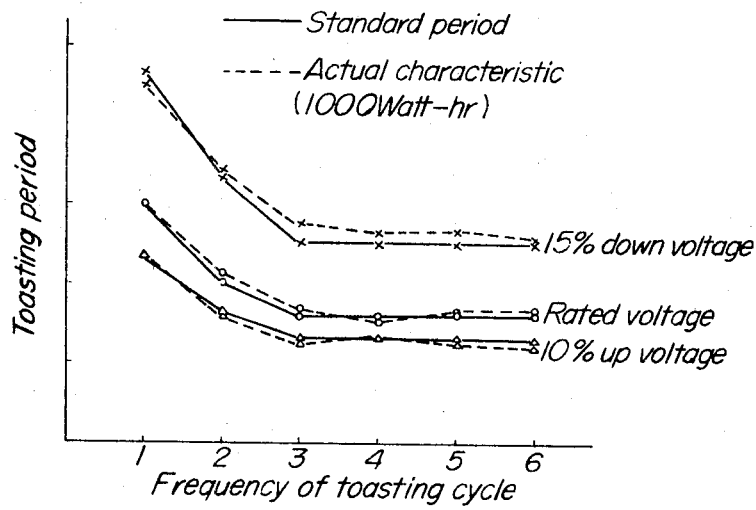
Figure 14B:
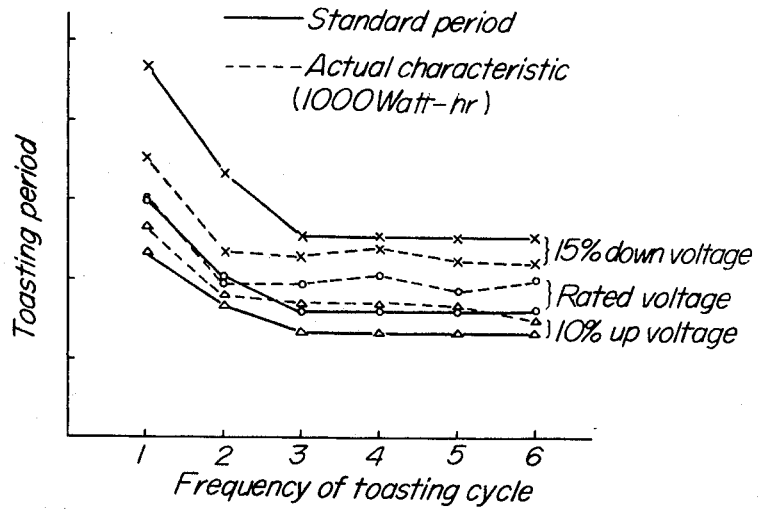
Figure 15:
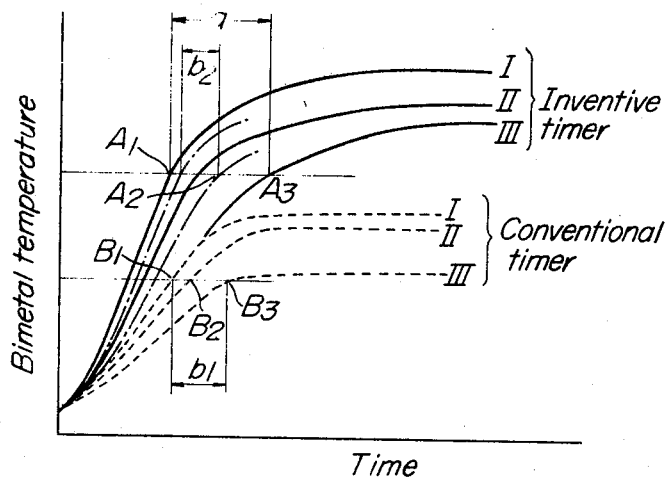
Figure 16:
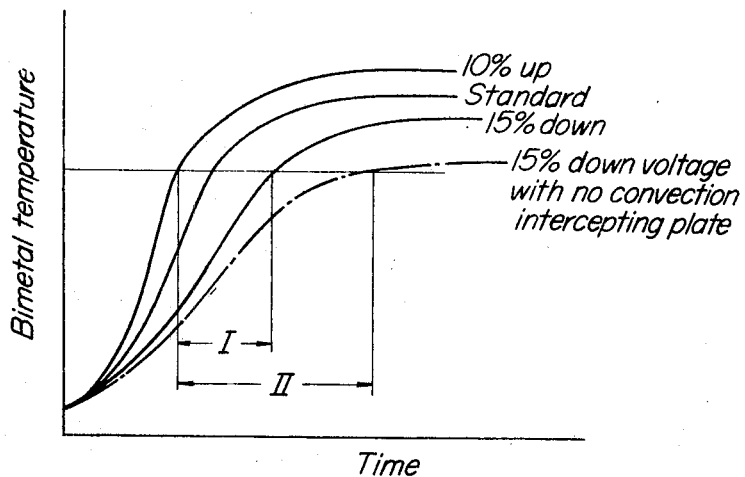
Figure 17A:
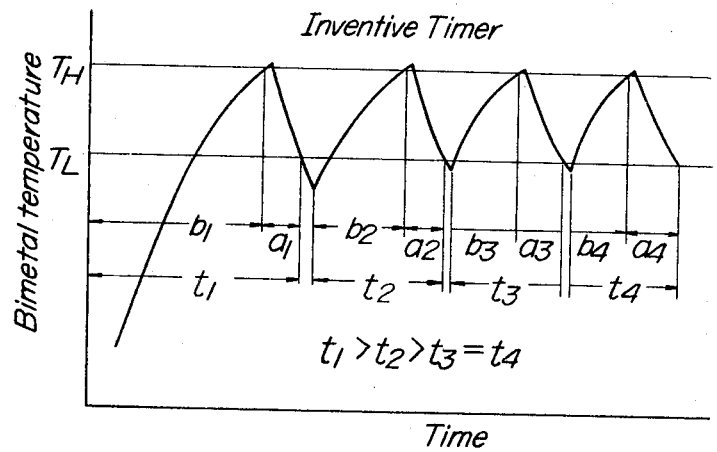
Figure 17B:
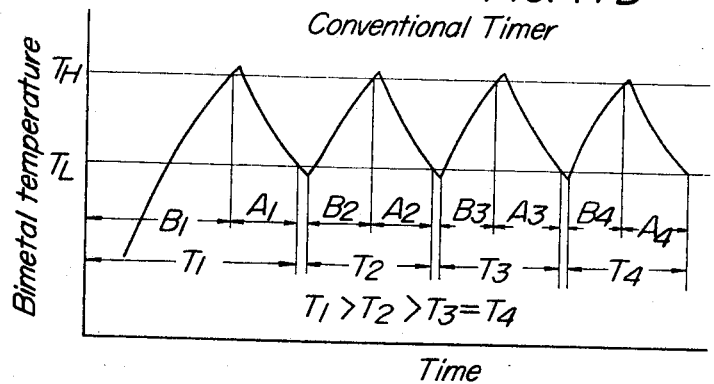

FIGS. 13 A–D are a set of side elevations illustrating the toasting period adjustable range of the thermal timer;

FIGS. 14A and 14B are a set of charts showing the time-temperature characteristic of the heat sensitive means of the thermal timer with respect to fluctuation of current voltage;

FIG. 15 is a chart showing the temperature rise of the heat sensitive means of the thermal timer of the present invention in comparison with that of a conventional one;

FIG. 16 is a chart of temperature characteristic curves illustrating the effect of a convection intercepting member disposed in the heat sensitive means of the thermal timer; and FIGS. 17A and 17B are a set of charts illustrating the continuous temperature characteristic of the heat sensitive means of the thermal timer of the present invention in comparison with that of a conventional one.

The thermal timer according to the present invention will be described hereinafter by way of an embodiment thereof which is adapted for use with any and all types of toasters.

Figure 1:
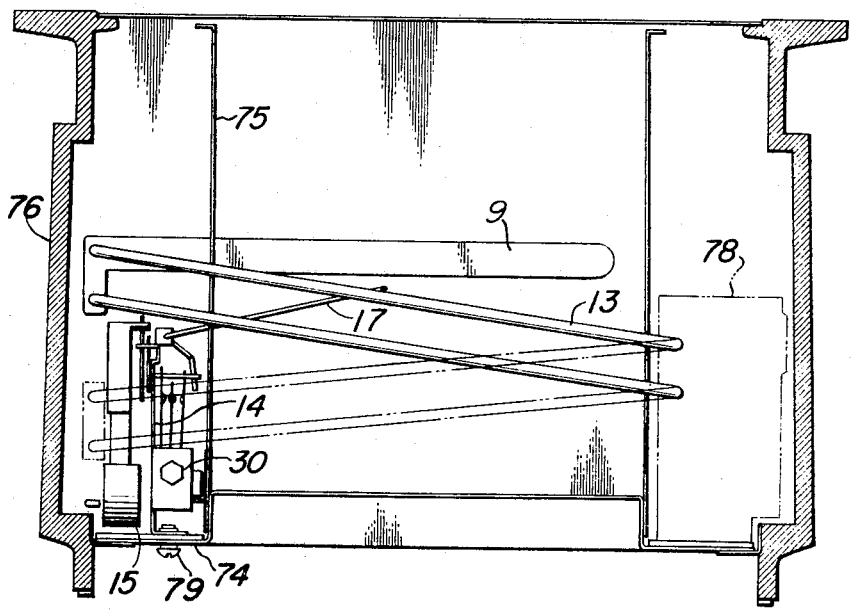
FIG. 1 is a side elevation of an entire automatic toaster in which the thermal timer of the present invention is incorporated.

Referring first to FIG. 1, there is shown a thermal timer embodying the present invention as incorporated in an automatic toaster having two toasting chambers. The manner in which the thermal timer is incorporated in the toaster will be described in detail later.

First of all, the component elements of the inventive thermal timer will be described with reference to FIGS. 2 to 8 wherein the constructions of the respective component elements are illustrated in detail.

A bimetallic element 2, which is the essential part of the heat sensitive means, is punched out in a rectangular shape from a high temperature-resistive material of a thickness of the order of 0.8 mm. and is formed into a substantially cylindrical shape having an inner diameter of about 12 mm. and a width of about 12 mm. A coil-shaped heater element 3 is disposed in the interior of the cylindrical bimetallic element 2 with three mm. space therebetween. The bimetallic element and the coil-shaped heater element will hereinafter be referred to as heat sensitive bimetallic element 2 and indirect heater element 3. The properties of the coil-shaped indirect heater element are such that it operates at a temperature above 700° C. at which it is heated to a red heat. The heat sensitive bimetallic element 2 has extensions 2–$a$ and 2–$b$ formed at respective ends thereof. One extension 2–$a$ is connected to a fitting 34 by means of spot welding, which fitting is fixed to a portion of a bracket 20 for the thermal timer by a screw 35, while the other extension 2–$b$ has an operating lever 36, of a length of about 50 mm., fixed thereto by such means as spot welding.

The cylindrical bimetallic element 2 is arranged with the longitudinally extending opening between the ends thereof facing upwardly, in which a convection intercepting member 34–$a$ of the fitting 34 is arranged in such a manner as to substantially close said opening. The fitting 34 serves to provide means for securing the bimetallic element 2 to the bracket 20 and simultaneously for supporting the indirect heater element 3. Namely, a lead of the indirect heater element 3 extends outwardly through an insulating tube 43 and this insulating tube 43 is mechanically held in position by an extension 34–$b$ of the fitting 34. The relative positions of the indirect heater element and the bimetallic element are fixed due to the construction described above. One end of the indirect heater element 3 is connected with a connecting lead 52 by means of a caulking member 51, while the other end of the same is connected to switch means as will be described later. The operating lever 36, which is connected to the bimetallic element by spot welding, has a U-shaped cross section so as to increase the mechanical strength thereof, and carries at its free end an engaging member 37 which is secured thereto by means of a rivet 38. The position of the engaging member 37 relative to the end extremity of the operating lever 36 is variable to some extent by manipulating a screw 39 extending through said operating lever. The engaging member is formed with a hooking lug 48 at its end extremity. In the figures, there is shown another screw 40 extending through the mid portion of the operating lever 36, the function of which will be described later.

Description will next be given of the switch means which is actuated by the deflection of the heat sensitive bimetallic element and the manner in which they are engaged with each other.

In describing first the electric circuit of this embodiment of the thermal timer with reference to FIG. 9, a main heater element 1 for toasting a slice of bread and the indirect heater element 3 are connected in series. A switch 5 for causing conducting or interrupting of current through the indirect heater element 3 is connected in parallel with said indirect heater element. Another switch 6 for power means 8 for automatically elevating a bread support, which is not directly concerned with the present thermal timer but is shown as an example, is connected to said heater elements in parallel, while a main switch 4 for the entire circuit is connected to said heater elements in series.

Although bread support elevating means is not described herein, the main switch 4 for the entire circuit is operated such that it is closed automatically when the bread support is lowered to the toasting position and is opened by the elevating power means 8 when the bread support is elevated upon completion of a toasting cycle.

Now, lever means 14 (see FIG. 1) cooperating with the heat sensitive bimetallic element will be described. The bracket 20 of the thermal timer, as shown in FIG. 7, has L-shaped bent lugs 20–a and 20–b formed at two places and also has two levers 21 and 22 rotatably mounted thereon by a pivot pin 28. A spring 23 is provided so as to urge the lever 21 to rotate to the left and the lever 22 to rotate to the right. The rotation of the lever 21 is stopped by a cut bent stop 24 upstanding on the bracket 20, while the rotation of the lever 22 is stopped by a similar stop 25. The levers 21 and 22 have bushings 26 and 27 associated therewith respectively to provide for smooth rotation on the pin 28.

The lever 21 is bent as at 21–a at a predetermined distance from the pivot pin for abutment against the screw 40 mounted in the operating lever of the heat sensitive bimetallic element 15. The lever 22 has a notch 22–a formed at a predetermined distance above of the pivot pin for engagement with the hooking lug 48 of the engaging member 37 carried on the operating lever 36 of the heat sensitive bimetallic element 15, whereby the lever 22 is caused to make a counterclockwise rotation. The other portions of the bracket will be described after a description is made of the switch means. The movable contact arms of the aforementioned switches 5 and 6 are integrally combined into a unit element as generally indicated at 16. In describing this unit element 16 with reference to FIGS. 4 and 6, a first contact strip 55 of the switch for controlling the indirect heater circuit carries thereon a contact 61, while a second contact strip 57 of the same carries thereon a contact 62. A flexible contact arm 53 forming the movable member of the switch 6 for controlling the bread support elevating power is arranged on the side opposite of the contact strip 55 with respect to the contact strip 53 in the same horizontal plane. The flexible contact arm 55 has a terminal strip 56 which simultaneously serves to prevent deformation of said contact strip. Similarly, the intermediate flexible contact arm 57 has a terminal strip 58 which simultaneously serves to prevent deflection of said contact strip. The flexible contact arm 53 has a terminal 53–a at its end. These contact strips are combined together in a juxtaposed relation and fixed to a support member 42 by means of a rivet 67 with insulating strips 59, 63, 64 and 65 of such material as mica interposed therebetween as shown in FIG. 8. The support member 42 has formed at its end a U-shaped spring portion and is secured to the bracket 20 by means of a screw extending through a hole in the L-shaped flexed lug 20–b of said bracket such a manner that the switch unit is slightly movable.

Figure 4:
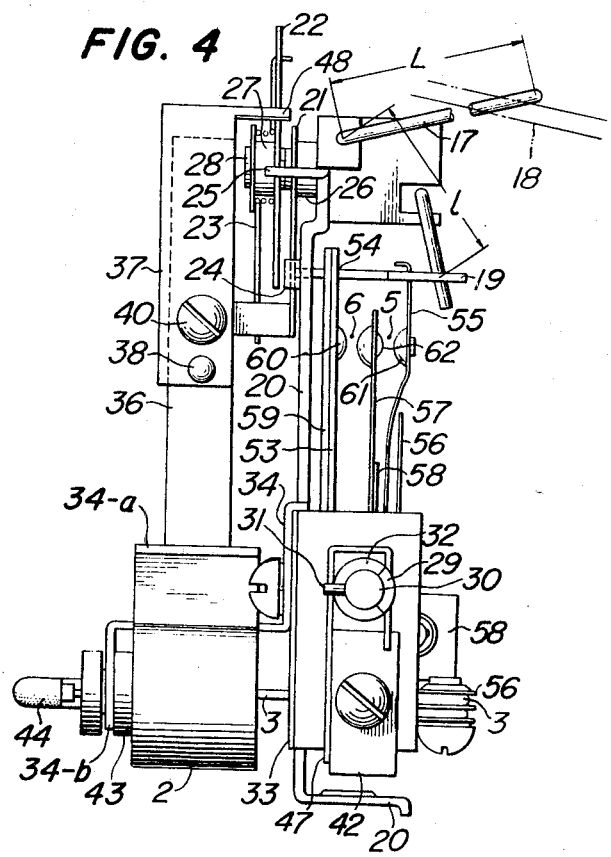
FIG. 4 is a front elevation illustrating more clearly the construction of the thermal timer of the present invention in position before operation.

The flexible contact arm 55 is spring biased to the left as viewed in FIG. 4 and has an abutment member 19 fixed to the top end thereof, said abutment member being made of an insulating material such as Bakelite. The tip end of the abutment member 19 is so arranged as to abut against the levers 21 and 22 at a point a predetermined distance below the pivot pin. In other words, the tip end of the abutment member 19 moves in a direction perpendicular to a plane in which said levers rotate. The switch means is mounted so as to be movable to some extent in the same direction as the rotating direction of the lever 21, so that the toasting period may be adjusted by varying the amount of engagement between the abutment member and the lever 21. The manner in which the toasting period is adjusted will be described in detail later under the description on operation of the timer.

On the L-shaped flexed lug 20–b of the bracket 20 is mounted an adjusting screw 30 by means of a nut 29, by which screw the spring biased switch means is displaced slightly. The tip end of the adjusting screw 30 is in abutment with the spring portion 42 of the switch means. The rotation of the adjusting screw 30 is restricted within a certain range by the engagement of a pin 31 mounted on said screw with a shoulder 32 formed on the nut 29.

The bracket 20 is fixed to the base of the toaster by means of a screw 79 through the hole 20–c in the L-shaped flexed lug 20–a.

Now, the operative connection of the thermal timer described above with bread support elevating means will be described hereunder. As described previously, the abutment member 19 fixed to the top end of the flexible contact arm 55 is urged towards the left, i.e., towards the lever 21, by the bias of said contact arm. An L-shaped lever 17, rotatably extending through a bearing portion 20–d formed at the top end of the bracket 20, has one end engaging with the abutment member 19 (see FIGS. 10A, 11A and 12) and has the other end arranged for engagement with bread support elevating parallel crank levers 13 when said levers 13 are in the elevated position as shown in FIG. 12. The crank levers 13 have their one ends pivotally supported by a bearing plate 11 on the toaster base for pivotal movement about respective fulcrums 12. The crank levers are elevated by the force of, e.g., an electromagnet not shown, and are lowered by the weight of a slice of bread mounted on the bread support, upon being released from conventional latch means by which said levers are held in the elevated position. It will be obvious that elevating means of any other form may be combined with the present thermal timer.

In describing the structure of the toaster shown in FIG. 1, the toaster comprises a base 74 having the central portion raised, inner end plates 75 welded to said base, outer end plates 76 made of such material as Bakelite and a top plate 77, all of which are integrally combined to form the structure of the toaster. In this toaster, the thermal timer described hereinabove is incorporated as shown. The construction of the elevating means 78 is omitted since it is not directly concerned with the present invention. Before finalizing the description on the construction of the thermal timer of the present invention, a description will be given of two conventional forms of thermal timer shown in FIG. 3. Referring to FIG. 3A which shows a heat conducting type thermal timer, a rectangular bimetal strip 68 is sandwiched between two insulating strips 69 of a material such as mica and then wound with a heater element 70. This is the form of conducting type which has been used most commonly. Turning now to FIG. 3B which shows a typical radiation type timer, a coil shaped or rectangular heater element 72 is arranged at a predetermined distance above a rectangular bimetallic element and above the heater element is further arranged a reflector 73 to improve the radiant efficiency. Conventional timers are basically categorized into the two types described above, though many other forms are available.

Hereinabove, the construction of the thermal timer of the present invention and the manner in which the timer is incorporated in a toaster have been described by way of example. Description will now be given of the operation of the thermal timer in the toaster.

First of all, cooperation of the timer with the elevating means will be described. The toaster shown in FIG. 1 is of the type wherein the bread support is automatically moved to the toasting position only by mounting a slice of bread thereon and is automatically returned to the nontoasting position under control of the action of the thermal timer. In the state shown in FIG. 1, a slice of bread is in the nontoasting position and all of the three contact strips of the switch means are disengaged from each other as shown in FIG. 2. Upon loading the bread support with a slice of bread, the bread support is lowered to the toasting position and, at the same time, the main switch 4 is brought into a closed position conducting a current through the toasting heater element and the indirect heater element 3, and thus toasting of the bread is commenced. The indirect heater element 3 is heated to a temperature of about 750° C. and the radiation heat as well as the convection heat therefrom heat up the convection intercepting member 34–a promoting the deflection of the bimetallic element. The engaging member 37 fixed to the operating lever 36 of the heat sensitive bimetallic element is brought into abutment with an edge 49a of the notch 49 formed in the lever 22 to cause said lever to rotate counterclockwise and the tip end of the screw 40 carried on the operating lever 36 is brought into abutment with the bent lug 21–a of the lever 21, either simultaneously or with a slight time difference depending upon the position of the screw, causing said lever to rotate clockwise against the bias of the spring. As a result, the amount of engagement of the lever 21 with the abutment member 19, fixed to the top end of the flexible contact strip 55, is decreased progressively and finally the lever 21 is disengaged from the abutment member 19 as the deflection of the bimetallic element proceeds over a certain period of time. The abutment member 19 comes into engagement with the lever 22 and at the same time the flexible contact strip 55 engages the intermediate contact strip 57, thus interrupting the current flowing through the indirect heater element 3 (FIG. 10) and the bimetallic element 2 therefore begins to cool. In this case, the toasting operation continues since the current is still conducted through the toasting heater element 1. As the bimetallic element is cooled, the tip end of the engaging member 37 is brought into abutment with the other edge 49b of the notch 49 formed in the lever 22, causing said lever to make a reverse rotation clockwise.

The amount of engagement of the lever 22 with the abutment member 19 is, therefore, decreased gradually and finally the lever 22 is disengaged from said abutment member 19. Consequently, all of the three contact strips are brought into engagement with each other by the bias of the contact strip 55 and the contacts 60, 61 and 62 in the circuit are shorted with each other conducting a current through the bread support elevating power means 8 (FIG. 11). Thus, the bread support is moved upwardly. Since the contact strips are moved only in an engaging direction, they are serviceable over an elongated period and yet the action is quick. Since the lever 18 rotatably extends through the top portion of the bracket and engages the parallel crank levers 13 when they are moved to the elevated positions, the abutment member 19 of the switch means is moved to the right against the bias of the contact strip 55. The lever 21, therefore, is returned to its original position under the force of the spring 23 for engagement with the operating lever 36 for another cycle of toasting operation. The current flowing through the toasting main heater element 1 is interrupted automatically upon actuation of the elevating power means 8 and the bread support is retained in the nontoasting position by mechanical means not shown. Thus, one cycle of toasting operation is accomplished. The operation described above is repeated in each of the following toasting cycles.

Now, the operation and characteristics of the heat sensitive means will be explained hereunder.

As described previously, the inventive thermal timer employs a radiation type heat sensitive means, the characteristics of which will be described in comparison with conventional conducting type means. In FIGS. 14A, 14B and 15, there is shown a comparison between the radiation type heat sensitive means as employed in the present invention and a conventional one of conducting type, in terms of followup characteristic as compared to fluctuation in source voltage. When reviewing the followup characteristic with respect to the toasting period of the toaster, it will be seen from FIG. 14 that, with the radiation type heat sensitive means as in the present timer, it is possible to obtain a characteristic very close to an optimum standard toasting period shown by the solid line, within a voltage fluctuation range from 10% up and 15% down. In contrast thereto, the characteristic curves of the conventional types shown in FIGS. 3A and 3B deviate greatly from the characteristic curve of the standard toasting period. Namely, in this case, the toasting period becomes longer than the standard period when the voltage rises, while it becomes shorter when the voltage drops. This means that bread is toasted darker when the voltage rises and is toasted lighter when the voltage drops, which is objectionable for a toaster. The above-mentioned characteristic also holds true for variation in the room temperature. Namely, the bread is toasted darker at a room temperature of 0° C. and lighter at a room temperature of 40° C.

In order to obtain a good followup characteristic relative to fluctuation of voltage, it is considered that the following conditions must be satisfied.

(1) The amount of heat supplied to the bimetallic element should be in complete proportion to voltage.

(2) The time required for the bimetallic element to follow up the fluctuating voltage, i.e., heating period should be long.

(3) Heat loss due to the configuration of the bimetallic element should be small.

When analyzing the characteristic of the conventional heat sensitive means with respect to the conditions set forth above, it will be understood that the operating temperature of the bimetallic element used is very low; that the ratio of heating period to cooling period is small, i.e., the heating period is relatively short and the cooling period is relatively long; that the heat transfer efficiency of the bimetallic element with respect to a fluctuation of voltage in the heater element is extremely low, i.e., the heat transfer rate of the insulating materials, such as mica, interposed between the bimetallic element and heater element in the heat conducting type is low; and that, in the conventional radiation type means, only a very small amount of heat is given to the bimetallic element, with a large proportion of the heat being dissipated wastefully. All of these facts contribute to the characteristic of the conventional heat sensitive means. The above-mentioned characteristic of the conventional means will be reviewed with respect to the voltage characteristic as follows:

Because of the low operating temperature of the bimetallic element, the bimetallic element reaches a temperature saturation point quickly at the time of 15% voltage drop shown by dotted line III in FIG. 15. Therefore, the bimetallic element is actuated before saturation, making it impossible to obtain a wide voltage range. Assuming that the operating point of the conventional means is raised, the temperature rises abruptly as indicated by the one-dot chain line in FIG. 15 due to the high temperature of the heater element and thus the bimetallic element is saturated at a high temperature. From this, it will be appreciated that, by increasing the heat capacity of the bimetallic element, while the rate of temperature rise may be reduced somewhat, the cooling period becomes longer on the other hand, and consequently the sum of the heating period and the cooling period of the thermal timer as a whole becomes greater, rendering a positive control difficult. After all, it is very difficult to raise the operating point of the conducting type heat sensitive means, and, with this type of means, it is only possible, as shown in FIG. 15, to obtain an allowable voltage fluctuation range of $b_1$ when the operating point is low and $b_2$ when the operating point is high. These ranges are very small as compared with that of the heat sensitive means employed in the present invention, and this is responsible for the variation in color of the toasted bread.

Another definite drawback of the conventional means is that the cooling period cannot be shortened. This is because, since the heater element is in contact with the bimetallic element, the cooling characteristic of the bimetallic element is related directly to the heat capacity of the heater element. When the heat capacity is reduced or the operating point of the bimetallic element is raised in order to shorten the cooling period, a sufficient toasting period cannot be obtained as described previously.

In contrast to the conventional means described above, the voltage characteristic of the present invention is entirely different from that of the conventional radiation type means, owing to the facts that the heat sensitive means of the present invention is arranged such that the bimetallic element is heated partly by the radiation heat and partly by the convection heat from the heater element, and that the bimetallic element is formed into a cylindrical shape in which the radiant efficiency is highest. Because of such features, the toasting period range $a$ at operating point A within the voltage fluctuation range from 10% up to 15% down can be obtained at a level where the operating period is sufficiently long. Explaining this further by means of numerals, when a bimetallic element having an outer diameter of 13 mm. and a thickness of 0.8 mm. is arranged about a heater element of 8 mm. in outer diameter, an operating temperature of the bimetallic element of about 400 to 420° C. is obtained at a temperature of the heater element of 780 to 800° C. and a wattage of about 30. In this case, the toasting period of a 1000 w. toaster is about 2 minutes. This operating temperature of the bimetallic element is believed to be the highest which is obtainable, in view of the allowable temperature of the bimetallic element being 500° C. The operating temperature of conventional bimetallic elements is usually within the range from 150 to 250° C. and most of these conventional bimetallic elements have a thickness of 1.8 mm. or larger. From the foregoing description, it will be understood that, according to the present invention, a wide range of allowable voltage fluctuation can be obtained with an extremely thin bimetallic element, even when the operating temperature is elevated. The first reason for this is that the amount of the radiation heat supplied to the bimetallic element varies in proportion to $T^4$ with varying temperature T caused by voltage fluctuation in the heater element and further the effective heat receiving area of the bimetallic element is increased as a result of forming said bimetallic element in a cylindrical shape. As described previously, the present timer enables a sufficiently long toasting period to be obtained in spite of the high temperature of the heater element. This is because the toasting period is largely influenced by the period elapsed before generation of the radiation heat and also by the interspace provided between the bimetallic element and the heater element. Another reason for the excellent voltage characteristic of the present heat sensitive means is attributed to the long heating period. Namely, because of the high operating temperature, the cooling rate is high and the time required for a minimum deflection of the bimetallic element to actuate the switch contact strip is very short, which in turn will enable the heating time to be prolonged. Consequently, the bimetallic element is more sensitive to a change in the heater element brought about by voltage fluctuation and thereby the effect mentioned in the first reason above is further promoted. The third reason for the excellent voltage characteristic is that the heat receiving element is arranged so as to receive the convection heat as well as the radiation heat. If the bimetallic element is to be operated only with the radiation heat, an undesirable result would be produced when the voltage dropped sharply or when the power supply to the toaster is small or when the toasting period is elongated, because the voltage fluctuation range becomes too wide. The voltage characteristic curve under such condition, that is the condition wherein no convection intercepting member is provided, is shown in FIG. 16 by the one-dot chain line. From this curve, it will be seen that the allowable voltage fluctuation range is expanded. In conclusion, it may be said that, when wattage is small, it is necessary to provide the convection intercepting member so as to elevate the saturation temperature and to enhance the heat receiving efficiency. As a result of employing such an arrangement, it is possible with the present heat sensitive means to obtain the excellent voltage characteristic as described before.

Now, let's analyze the continuous toasting period characteristic of the thermal timer of the present invention with respect to the temperature characteristic of the heat sensitive means.

In order to obtain an optimum toasting degree at each cycle of continuous toasting operation, the thermal timer used is required to be capable of controlling the toasting period such that said toasting period is shortened progressively as the toasting cycle is repeated. With the conventional thermal timers, however, while there is a difference between the toasting periods of a first and second toasting cycles, the toasting periods of the second toasting cycle and onwards are not substantially changed, as shown in FIG. 17B, resulting in a color difference of the toasted slices of bread. This renders the design of the toasting oven in the toaster extremely difficult. The present thermal timer has obviated the foregoing drawback. The reasons for this will be explained hereunder with reference to FIGS. 17A and 17B.

When the temperature characteristic curve of the bimetallic element employed in the present invention is drawn from a continuous toasting operation conducted with a fixed resetting time interval between successive toasting cycles, the heating period of the second toasting cycle varies from that of the third toasting cycle $(b_1 > b_2 > b_3 = b_4)$ as shown by the curve in FIG. 17A, on account of the fact that, because of the high operating temperature, the rise of the radiation heat is somewhat delayed even when current is conducted again after a short resetting time upon completion of the cooling process $a$ in the preceding cycle; the thermal inertia of the dissipating heat; and the level of the ambient temperature at the time of completion of the toasting cycle. This is attributed to the cooling characteristic upon completion of the toasting cycle and temperature rise characteristic at the beginning of the toasting cycle of the heater element at the first and second toasting cycles.

In the case of the conventional timers, which, as described before, have a low operating temperature, a short heating period and a long cooling period, there is no thermal inertia during cooling, and further the time lag between the temperature rise of the heater element and the temperature rise of the bimetallic element is small. The temperature rise curves of the heater element for the second toasting cycle and onwards are, therefore, substantially the same. Even when there is produced a slight difference between said temperature rise curves in practice, the cooling period is gradually prolonged little by little, with the result that the toasting period is substantially the same in the second toasting cycle and onwards $(T_1 > T_2 \doteqdot T_3 \doteqdot T_4)$. The temperature range from $T_H$ to $T_L$ is a minimum range for causing deflection of the bimetallic element to actuate the circuit switch.

The thermal timer of the present invention will now be compared with the conventional ones in respect of the irregularity characteristic. Referring to the ratio of a toasting period variation during continuous toasting operation to the practical toasting period shown in FIG. 14, which is deviating from the standard toasting period, the variation with the present thermal timer described herein is within 2 to 3% at the rated voltage, within 3% at a 10% up voltage and within 4% at a 15% down voltage, whereas that with a conventional timer is 5% at the rated voltage, 5% at a 10% up voltage and 8% at a 15% down voltage. The reasons for this difference are completely explained by the differences in temperature characteristics as described previously. Namely, the reasons may be summarized as follows:

(1) The operating temperature is so high that it is not influenced by the ambient temperature.

(2) The sensitivity of the bimetallic element can be enhanced by its small thickness.

(3) The heat sensing period is long, so that the structural instability of the cooling characteristic is reduced.

Figure 13A:
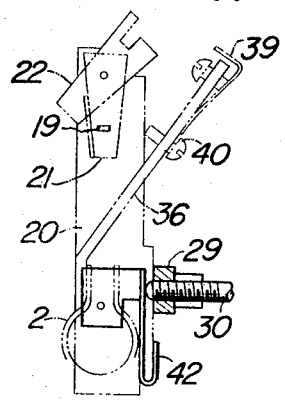
Figure 13B:
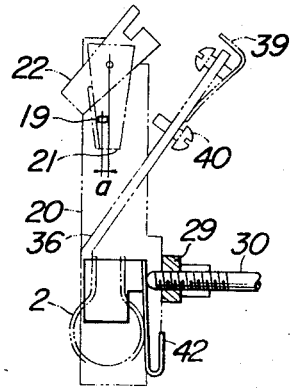
Figure 13C:
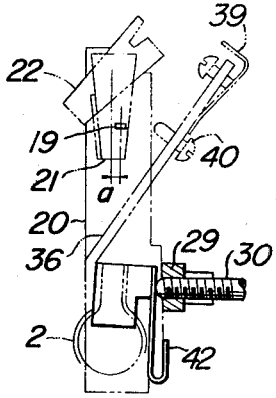
Figure 13D:
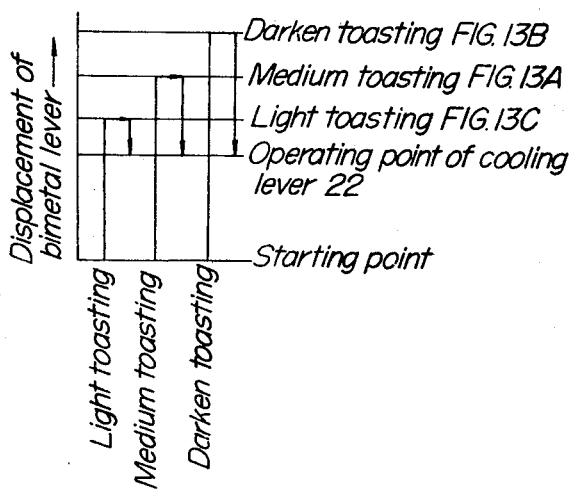

Now that the explanation relative to the heat sensitive means has been completed, the construction and operation of the present thermal timer described herein will be further explained hereinafter. A series of operations of the thermal timer has been explained previously. Describing the toasting period adjusting means with reference to FIG. 13, by which bread toasted to a desired toasting degree can be obtained, the present thermal timer is the same as conventional ones in that the toasting operation is controlled by the sum of the heating period and cooling period of a bimetallic element. However, most of the conventional timers are of the type in which only the heating period is utilized for the adjustment of the toasting degree, in spite of the fact that the absolute length of the heating period is relatively small as mentioned hereinabove. Therefore, they have the drawback that the adjustable range of the toasting degree is very narrow. Even in the timers of the type wherein the cooling period is also adjustable, such an adjustment is made by moving the supported end of a bimetallic element, making the mechanism complicated and instable. The manner in which the toasting degree is adjusted in the present thermal timer will be expained by way of example. FIG. 13(A) shows the position of the present timer for toasting bread to a medium color; FIG. 13(B) shows the position of the timer for toasting bread to a dark color and FIG. 13(C) shows the position of the timer for toasting bread to a light color. From these figures, it will be seen that the toasting degree is adjusted by varying the amount of engagement of the abutment member 19, carried on the flexible switch contact strip 55, with the movable portions of levers 21 and 22 to thereby vary the engaging period therebetween, by depressing the support spring 42 of the switch unit 16 with the adjusting screw 30 while holding the bimetallic element stationary.

When a slice of bread is desired to be toasted to a light color, the abutment member of the switch means 16 is displaced from the position shown in FIG. 13(A) to the position shown in FIG. 13(C) by a distance a by turning the adjusting screw to the left. Therefore, the time required for disengagement of the abutment member 19 from the lever 21, that is the heating period, is shortened and further the angle of rotation of the lever 22 caused by engagement of the notch formed therein with the tip end of the engaging member 39 carried on the operating lever 36 is decreased, due to abutment of the screw 40 on the operating lever against the lever 21. It will be understood, therefore, that the length of time of engagement between the lever 22 and the abutment member 19 upon expiration of the heating period is shorter than that in which the parts are in the state shown in FIG. 13(A). This means that the cooling period is also shortened. In the manner described, the total period of heating and cooling may be shortened considerably as compared with that obtainable when the parts are in the position shown in FIG. 13(A).

When, on the contrary, the amount of engagement between the abutment member 19 and the lever 21 is increased as shown in FIG. 13(B) by turning the adjusting screw 30 to the right, the time required for the disengagement of the abutment member 19 from the lever 21, that is the heating period of the bimetallic element, is prolonged, with the result that the angle of counterclockwise rotation of the lever 22 is increased and time of engagement between the lever 22 and the abutment member 19 increases. Consequently, the time in which the lever is brought into a disengaging position by the cooling of the bimetallic element is prolonged considerably and the total of the heating period and cooling period is increased considerably. In this way, the toasting degreee of bread can be adjusted from a dark color to a light color in a wide range. Such a relationship is shown in a block diagram in FIG. 13(D). From this figure, it will be seen that the toasting period and therefore the toasting degree of bread may be adjusted in a wide range by fixing the starting point of the lever and operating point of the cooling lever so as to vary the operating point of the heating lever and to vary the moving distance of the heating and cooling levers.

It will be recognized that this invention is not limited to the specific details of the embodiment herein shown and described but includes such modifications and variations which may be made without departing from the scope of the appended claims.

What is claimed is:

1. A heat up-cool down type thermal timer for toasters, comprising in combination main heater means arranged in a toaster oven for toasting bread, auxiliary heater means connected in series with said main heater means, bimetal means to be heated by said auxiliary heater means and carrying an elongate operating lever, a plurality of lever means and connected to each other in parallel and upon engagement with said operating lever which is displaced by deflection of said bimetal means, switch means for opening and closing the circuit of said auxiliary heater means adapted to be actuated by pivotal movement of said lever means and connected to each other in parallel and control means to vary the engaging point between said switch means and said lever means, the point at which heat deflection of said bimetal means begins and the point at which cooling deflection of said bimetal means caused by shorting of the circuit of said auxiliary heater means terminates being fixed, whereby the period of one heat up-cool down cycle is controlled by varying the amount of engagement between said lever means and said switch means and thereby displacing the point at which the heat deflection of said bimetal means terminates.

2. A heat up-cool down type thermal timer for toasters, comprising in combination main heater means comprising a toaster oven, bracket means for the thermal timer, bimetal means having one edge fixed and carrying an elongate operating lever at the movable edge thereof, auxiliary heater means for heating said bimetal means connected to said main heater means in series, switch means consisting of a plurality of contact strips secured to each other with an insulating material interposed therebetween, one of said contact strips being spring biased in one direction to bring all contacts carried by respective contact strips into closed positions, an abutment member mounted on the top end of said spring biased contact strip at right angles thereto, and a plurality of lever means coaxially mounted on said bracket means in a predetermined spaced relation while being spring biased in opposite directions and held in predetermined positions for engagement with said operating lever of the bimetal means, said abutment member of the switch means being arranged to abut against said lever means at a point a predetermined distance below the fulcrum of said lever means in a direction perpendicular to a plane in which said lever means makes a pivotal movement to thereby maintain a space between the contacts, whereby, when said bimetal means is deflected, said lever means are rotated to be released from engagement with said abutment member of the switch means one after another to thereby control the toasting period.

3. A heat up-cool down type thermal timer for toasters, comprising in combination main heater means arranged in a toaster oven for toasting a slice of bread, auxiliary heater means connected to said main heater means in series, bimetal means to be heated by said auxiliary heater means having one edge fixed and carrying an elongate operating lever fixed at the movable edge thereof, a bread carrier adapted to cyclically move between its toasting and nontoasting positions within said main heater means, power means to elevate said bread carrier, bracket means for the thermal timer, a plurality of lever means coaxially mounted on said bracket means in a predetermined spaced relation while being spring biased in opposite directions and adapted to be rotated by engagement with said operating lever of the bimetal means and switch means consisting of a plurality of flexible contact arms secured to each other with an insulating material interposed therebetween, one of said flexible contact arms being spring biased in one direction and carrying at its top end an abutment member arranged at right angles thereto and adapted to engage with the rotational plane of said lever means and said switch further being composed of a contact arm to open the circuit of said auxiliary heater means and a contact arm to close the circuit of said power means for elevating said bread carrier, whereby, when said bimetal means is deflected by heating and deflected reversely by cooling, the operating lever is displaced causing said lever means is deected by heating and deflected reversely by with each other one after another deenergizing the auxiliary heater means and energizing the elevating power means.

4. A heat up-cool down type thermal timer for toasters, comprising in combination main heater means arranged in a toaster oven for toasting of bread, main circuit switch means adapted to be controlled in a toasting position, auxiliary heater means connected to said main heater means in series, bimetal means to be heated by said auxiliary heater means and carrying at its movable edge an elongate operating lever, a bread carrier adapted to move between its toasting and nontoasting positions within the toaster oven, power means for elevating said bread support, bracket means for the thermal timer, a plurality of lever means coaxially mounted on said bracket means in a predetermined spaced relation and held in predetermined positions while being spring biased in opposite directions from each other, said lever means being adapted to be rotated by engagement with said operating lever of the bimetal means, switch means consisting of a plurality of contact strips secured to each other with an insulating material interposed therebetween with a common contact strip in the center thereof, one of the outermost flexible contact arms being spring biased in one direction, abutment means mounted on the top end of said spring biased outermost flexible contact arm and arranged for engagement with said lever means at right angles to the rotational plane of said lever means, and flexible contact arm return lever means having one end operatively connected to said bread support and the other end operatively connected to said abutment means mounted on said outermost flexible contact arm, said main heater means and said auxiliary heater means being energized to heat said bimetal means when said bread carrier is moved into the toasting position, said operating lever of the bimetal means being displaced by deflection of the bimetal means to engage said lever means, said lever means being rotated in opposite directions to each other, said abutment means being disengaged from first lever means whereby the circuit of the auxiliary heater means is opened, and said abutment means being disengaged from second lever means upon reverse deflection of said bimetal means caused by cooling whereby said elevating power means is energized to elevate said bread carrier whereupon said flexible contact arm return lever is operated to bring said flexible contact arm into engagement with said lever means again.

5. Controlled heating means for toasters, comprising; toasting heater means adapted to be positioned in a toaster oven for toasting bread; thermal timer means consisting of a bimetallic element in a substantially cylindrical shape having two opposed edges circumferentially spaced from each other with a longitudinal opening therebetween extending along the total length of the bimetallic element, said bimetallic element being disposed horizontally with said longitudinal opening facing upwardly and having one edge fixed and the other edge free; an elongated operating lever means having one end fixed to the free edge of said bimetallic element; auxiliary heater means for heating said bimetallic element, said auxiliary heater means being connected in series with said toasting heater means and consisting of a coil-shaped conductor concentrically positioned within said bimetallic element with a small space between the coil-shaped conductor and said bimetallic element; switch means coupled to said toaster heating means and including a switch coupled in the power supply of said auxiliary heater means, said switch means being engageable by said operating lever means to be actuated by displacement of said operating lever means; whereby said cylindrical bimetallic element is deflected by the radiation heat from the entire periphery of said auxiliary heater means to cause displacement of said operating lever means and thereby actuating said switch means to open the power supply circuit of said auxiliary heater means to allow said auxiliary heater means to cool, whereby the toasting cycle is controlled by the periods of heat induced deflection and cooling induced deflection of said bimetallic element.

6. Controlled heating means as claimed in claim 5 wherein, said bimetallic element has a heat receiving plate means extending from the fixed edge into said longitudinal opening for receiving the convection heat from said auxiliary heater means, said cylindrical bimetallic element being deflected by the action of said radiation heat from said auxiliary heater means and the convection heat from said auxiliary heater means transmitted to said bimetallic element through said heat receiving plate means.

7. Controlled heating means as claimed in claim 5 further comprising bracket means for fixing said bimetallic element to a toaster, one end of said heat receiving plate means being extended and depending into proximity with one axial end of said cylindrical bimetallic element and having insulating material therein attached to one end of said auxiliary heater means, and the other end of said heat receiving plate means being fixed to said bracket means, whereby said bimetallic element and heat receiving plate means are combined integrally with said auxiliary heater means.

References Cited
UNITED STATES PATENTS

| | | | |
|---|---|---|---|
| 2,250,997 | 7/1941 | Miller | 219—493 |
| 2,350,403 | 6/1944 | Kulka | 337—111 |
| 2,523,897 | 9/1950 | Besag et al. | 337—111 |
| 2,542,415 | 2/1951 | Jeffrey | 337—111 |

BERNARD A. GILHEANY, Primary Examiner

F. E. BELL, Assistant Examiner

U.S. Cl. X.R.

99—329; 337—111, 377